(12) United States Patent
Forutanpour et al.

(10) Patent No.: US 10,347,254 B2
(45) Date of Patent: *Jul. 9, 2019

(54) LEVERAGING HEAD MOUNTED DISPLAYS TO ENABLE PERSON-TO-PERSON INTERACTIONS

(71) Applicant: QUALCOMM Incorporated, San Diego, CA (US)

(72) Inventors: Babak Forutanpour, San Diego, CA (US); Daniel S. Baker, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/724,608

(22) Filed: Oct. 4, 2017

(65) Prior Publication Data

US 2018/0047396 A1 Feb. 15, 2018

Related U.S. Application Data

(63) Continuation of application No. 13/739,925, filed on Jan. 11, 2013.

(Continued)

(51) Int. Cl.
*G10L 15/26* (2006.01)
*G06F 17/28* (2006.01)
(Continued)

(52) U.S. Cl.
CPC .......... *G10L 15/265* (2013.01); *G06F 17/289* (2013.01); *G09B 21/009* (2013.01);
(Continued)

(58) Field of Classification Search
CPC ...... G10L 15/2628; G10L 15/30; G10L 17/22
(Continued)

(56) References Cited

U.S. PATENT DOCUMENTS 4,720,863 A 1/1988 Li et al.
7,716,376 B1 5/2010 Price et al.
(Continued)

FOREIGN PATENT DOCUMENTS

CN 1762145 A 4/2006
CN 1991982 A 7/2007
(Continued)

OTHER PUBLICATIONS

Mirzaei, et al., "Using audio-visual speech recognition techniques in augmented reality environment," 26th Int. Conf. Image and Vision Computing, 2011.*

(Continued)

*Primary Examiner* — Feng-Tzer Tzeng
(74) *Attorney, Agent, or Firm* — Kilpatrick Townsend & Stockton, LLP

(57) ABSTRACT

Various arrangements for using an augmented reality device are presented. Speech spoken by a person in a real-world scene may be captured by an augmented reality (AR) device. It may be determined that a second AR device is to receive data on the speech. The second AR device may not have been present for the speech when initially spoken. Data corresponding to the speech may be transmitted to the second augmented reality device.

30 Claims, 9 Drawing Sheets

Related U.S. Application Data

(60) Provisional application No. 61/702,614, filed on Sep. 18, 2012.

(51) Int. Cl.
| | | |
|---|---|---|
| *G09B 21/00* | (2006.01) | |
| *G10L 15/28* | (2013.01) | |
| *G10L 17/22* | (2013.01) | |
| *G10L 15/30* | (2013.01) | |

(52) U.S. Cl.
CPC .............. *G10L 15/26* (2013.01); *G10L 15/28* (2013.01); *G10L 15/30* (2013.01); *G10L 17/22* (2013.01)

(58) Field of Classification Search
USPC ...................................... 704/E15.04, E15.043
See application file for complete search history.

(56) References Cited

U.S. PATENT DOCUMENTS

| | | | | |
|---|---|---|---|---|
| 8,184,983 | B1* | 5/2012 | Ho | ........................ H04B 11/00 345/156 |
| 2002/0180799 | A1* | 12/2002 | Peck | ....................... G06F 3/013 715/784 |
| 2003/0017846 | A1 | 1/2003 | Estevez et al. | |
| 2005/0013419 | A1 | 1/2005 | Pelaez et al. | |
| 2006/0095265 | A1 | 5/2006 | Chu et al. | |
| 2006/0122840 | A1 | 6/2006 | Anderson et al. | |
| 2008/0088698 | A1 | 4/2008 | Patel et al. | |
| 2008/0159601 | A1 | 7/2008 | Alberth et al. | |
| 2008/0285772 | A1 | 11/2008 | Haulick et al. | |
| 2009/0210803 | A1 | 8/2009 | Brignull et al. | |
| 2010/0110099 | A1* | 5/2010 | Averett | ................. G06F 16/951 345/592 |
| 2011/0096135 | A1* | 4/2011 | Hegde | ................ H04N 5/23219 348/14.07 |
| 2011/0106534 | A1 | 5/2011 | Lebeau et al. | |
| 2011/0279639 | A1 | 11/2011 | Anand et al. | |
| 2011/0285807 | A1* | 11/2011 | Feng | ................. G06K 9/00228 348/14.08 |
| 2012/0078607 | A1 | 3/2012 | Sumita | |
| 2012/0078628 | A1 | 3/2012 | Ghulman | |
| 2012/0319949 | A1 | 12/2012 | Lee | |
| 2013/0262107 | A1 | 10/2013 | Bernard | |
| 2013/0289971 | A1 | 10/2013 | Parkinson et al. | |
| 2014/0081634 | A1 | 3/2014 | Forutanpour et al. | |

FOREIGN PATENT DOCUMENTS

| | | | |
|---|---|---|---|
| CN | 101809651 A | 8/2010 | |
| CN | 102473322 A | 5/2012 | |
| CN | 101529899 B | 7/2012 | |
| CN | 101930125 B | 11/2012 | |
| EP | 2207164 * | 7/2010 | ............. G10L 15/28 |
| EP | 2207164 A2 | 7/2010 | |
| EP | 2207164 A3 | 12/2010 | |
| JP | 2011186007 A | 9/2011 | |
| KR | 20110131247 A | 12/2011 | |
| WO | 2013163293 A1 | 10/2013 | |

OTHER PUBLICATIONS

Mirzaei, et al., "Using audio-visual speech recognition techniques in augmented reality environment," 26th Int. Conf. Image and Vision Computing, 2013.*

International Search Report and Written Opinion—PCT/US2013/055900—ISA/EPO—Nov. 11, 2013.

Mirzaei, et al., "Using Audio-Visual Speech Recognition Techniques in Augmented Reality Environment," Twenty-sixth International Conference Image and Vision Computing New Zealand Nov. 29-Dec. 1, 2011, pp. 1-6, Auckland, New Zealand.

* cited by examiner

LEVERAGING HEAD MOUNTED DISPLAYS TO ENABLE PERSON-TO-PERSON INTERACTIONS

RELATED APPLICATIONS

This application is a continuation of U.S. patent application Ser. No. 13/739,925, filed Jan. 11, 2013 entitled "Leveraging Head Mounted Displays To Enable Person-To-Person Interactions", which claims priority from U.S. Provisional Patent Application No. 61/702,614, filed Sep. 18, 2012 entitled "Leveraging Head Mounted Displays to Enable Multi-Language Interactions", which is hereby incorporated by reference, as if set forth in full in this document, for all purposes.

BACKGROUND

As the world becomes a global community, persons, who may speak different languages, frequently need to interact. Whether the occasion is communication between employees of a company with offices on different continents, multinational summits, tourism, or any other situation resulting in a language difference between persons, the ability to communicate effectively and efficiently is useful. Typically, such communication between persons speaking different language may involve the use of an interpreter, primitive physical gestures, or entering text into a device that performs a translation. Each of these arrangements has drawbacks: an interpreter can be expensive and involves at least an additional person being involved in the communication, only a limited amount of information may be able to be communicated using primitive physical gestures, and typing text into a computerized device may be inefficient and require the necessary equipment.

Additionally, latecomers (or persons who are not paying attention) to conversations, speeches, or presentations may miss important statements of the speaker. Conventionally, the latecomer may ask someone who was present about what was said, directly question the speaker, and/or miss out on the earlier discussed aspects. None of these options may be optimal: another person may become annoyed at being asked about the earlier speech of the speaker and/or the latecomer's tardiness (or the person's lack of attention) may be emphasized as two examples.

SUMMARY

An example method for using augmented reality devices, according to the description, comprises capturing, by a first augmented reality device, speech spoken by a person while the person is in a real-world scene within a field of view of a user of the first augmented reality device, the first augmented reality device comprising a first head-mounted display. The method further comprises determining who, in the real-world scene, spoke the speech by determining a direction from which the speech originated or an identity of a head-mounted display in use by the person who spoke the speech, and generating an indication of the person that spoke the speech based on the determination of who spoke the speech. The method also comprises determining, by the first augmented reality device, a second augmented reality device to receive text corresponding to the speech, the second augmented reality device comprising a second head-mounted display, and transmitting, by the first augmented reality device, the text corresponding to the speech and the indication of the person that spoke the speech to the second augmented reality device.

An example augmented reality system, according to the description, comprises a first augmented reality device, comprising a microphone, a communication module, a first processor, a first head-mounted display, and a memory communicatively coupled with and readable by the first processor. The first processor is configured to capture, from the microphone, speech spoken by a person while the person is in a real-world scene within a field of view of a user of the first augmented reality device, determine who, in the real-world scene, spoke the speech by determining a direction from which the speech originated or an identity of a head-mounted display in use by the person who spoke the speech, and generate an indication of the person that spoke the speech based on the determination of who spoke the speech. The first processor is further configured to determine a second augmented reality device comprising a second head-mounted display to receive text corresponding to the speech, and cause the text corresponding to the speech and the indication of the person that spoke the speech to be transmitted to the second augmented reality device via the communication module.

An example augmented reality apparatus, according to the description, comprises first head-mounted display means, means for capturing speech spoken by a person while the person is in a real-world scene within a field of view of a user of the augmented reality device, means for determining who, in the real-world scene, spoke the speech by determining a direction from which the speech originated or an identity of a head-mounted display in use by the person who spoke the speech, and means for generating an indication of the person that spoke the speech based on the determination of who spoke the speech. The example augmented reality apparatus further comprises means for determining a second augmented reality device to receive text corresponding to the speech, the second augmented reality device comprising second head-mounted display means, and means for transmitting the text corresponding to the speech and the indication of the person that spoke the speech to the second augmented reality device.

An example computer program product, according to the description, resides on a non-transitory processor-readable medium for augmenting reality, the computer program product comprising processor-readable instructions configured to cause a processor of a first augmented reality device comprising a first head-mounted display to capture speech spoken by a person while the person is in a real-world scene within a field of view of a user of the first augmented reality device, determine who, in the real-world scene, spoke the speech by determining a direction from which the speech originated or an identity of a head-mounted display in use by the person who spoke the speech, generate an indication of the person that spoke the speech based on the determination of who spoke the speech, determine a second augmented reality device comprising a second head-mounted display to receive text corresponding to the speech, and cause the text corresponding to the speech and the indication of the person that spoke the speech to be transmitted to the second augmented reality device by the first augmented reality device.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
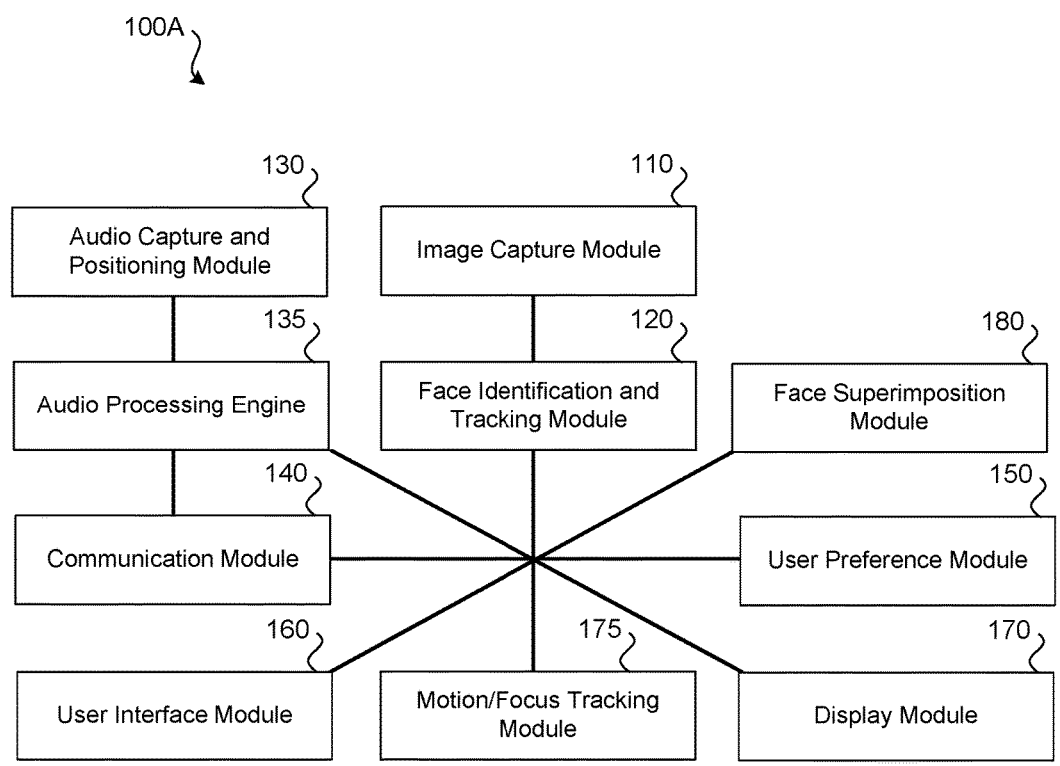
FIG. 1A illustrates an embodiment of a system configured to present virtual objects via a head mounted display.

An augmented reality (AR) device, such as AR glasses or, more generally, any form of wearable augmented reality device that includes a head mounted display (HMD) may allow a user to view real-world scenes superimposed with virtual objects (e.g., applications, text, graphics) displayed to the user by the HMD. For example, an AR device may use a camera to capture images of a scene being viewed by the user and may superimpose virtual objects based on the type and/or position of real-world objects within the scene. The HMD may be used to present information that the user is interested in, such as text corresponding to speech occurring in the scene viewed by the user.

If one or more other persons are using AR devices during a conversation, it may be possible for a user, when using an AR device joining a conversation already in progress (or if the user was not paying attention), to receive text of at least portions of the conversation for which the user was not present or was not listening to. For instance, via a device-to-device communication protocol, another augmented reality device, possessed by a person present for the conversation may transmit the text of the conversation. This text may be displayed by an HMD to the user in the form of speech bubbles for the persons present in the scene. An indication of the person to whom the text should be attributed (e.g., an image of the person's face and/or an identification of the person's augmented reality device) may also be transmitted. The text of the past conversation may be presented to the user and displayed in speech bubbles or in some other form of virtual object by the HMD worn by the user. The text in each speech bubble may be added to as additional speech is spoken by the persons. As such, a user may be able to navigate through speech that occurred while the user was not listening (e.g., the user was not present or was not paying attention).

When the text corresponding to past speech of one speech bubble is reviewed, text in other speech bubbles corresponding to other persons that were present in the scene at the time of the speech may simultaneously be displayed so that the user has context of each side of a conversation that occurred at the time. In some embodiments, words deemed important may be emphasized as displayed to the user to allow the user to quickly identify key portions of a person's speech.

AR devices may also be useful in helping two or more people who speak different languages interact. If a user is using an HMD of an AR device, the AR device may be able to capture speech from a person that is spoken in a different language than the user's native language (or some other language that the user desires to use). The AR device may be configured to detect when the person's spoken language is different than the user's native language. The speech of the person may be captured and transmitted to a remote server for translation into the user's native language (or some other selected, desired language) and transcribed into text. The text in the user's native language of what the person said (in the foreign language) may be displayed to the user via the HMD of the AR device. The text may be presented to the user as a virtual object superimposed onto the real-world scene by the AR device. The virtual object may be presented to the user in the form of a speech "bubble," similar to text in some comic strips, to show the text is attributed to the person who spoke the words in the foreign language. While, or shortly after, the person spoke in the foreign language, the user may be able to read the text of the person's speech in the user's native language and know the text can be attributed to the person. Such an arrangement may allow two or more persons who speak different languages to successfully communicate while relying on AR devices for assistance in language translation and transcription. Moreover, since the user is not listening to alternative audio instead of the person's speech, the person's emotion level may be more easily ascertained by the user. In some embodiments, the virtual object may present the text to the user as scrolling text that is superimposed over the face of the person who spoke the text. As such, the user of the AR device can maintain (or at least appear to maintain) eye contact with the person who spoke the speech. In some embodiments, the virtual object may be aligned with the eyes of the person who spoke the speech. As such, it may not appear to the speaker that the user is reading a speech bubble displayed over the head of the speaker (or somewhere else near the speaker).

Such an arrangement may be able to differentiate the origin of speech from among multiple persons present in a scene. An AR device may be able to determine the direction or location of received speech (such as by using multiple microphones and performing a time-of-flight analysis) and determine which person was located where the speech originated. Accordingly, speech spoken may be attributed to the proper person present in the scene viewed by the user. Faces present within the scene may be identified. Accordingly, if two or more persons are present in a scene, speech may be attributed to the proper person, and thus a speech bubble may be present for each person and contain only text that is attributed to that particular person. By tracking a voice and/or face of a person present in the scene, the person's speech bubble may track the person as he or she moves around the scene and/or exits and reenters the scene (even when the person is not talking).

Further, arrangements may be presented that combine the language translation aspects with the speech sharing aspects. As such, if a user of an AR device is not present for speech, the user's AR device may be able to request and receive text corresponding to the speech, even if the user's native or selected language is different than the language the speech was initially spoken in and/or initially translated to.

FIG. 1A illustrates an embodiment of a system 100A configured to display virtual objects via a head-mounted display (HMD) to a user. System 100 may be part of an augmented reality (AR) device. System 100 may include image capture module 110, face identification and tracking module 120, audio capture and positioning module 130, audio processing engine 135, communication module 140, user preference module 150, user interface module 160, display module 170, motion/focus tracking module 175, and face superimposition module 180. Other embodiments of system 100 may include fewer or greater numbers of components. Commonly known components have been omitted from FIG. 1 for simplicity, such as power supply components. One or more processors may perform the functions of one or more of the modules of system 100A. A computer system, such as computer system 700 of FIG. 7 may perform the functions of one or more modules of system 100. To be clear, "user" refers to a person that is using the AR device (which may contain system 100), "person" refers to some other person, who may or may not be using an AR device (which may contain system 100).

Image capture module 110 may be configured to periodically capture an image of a scene that is being viewed by a user. For instance, image capture module 110 may include an image capture device that is positioned to capture a field-of-view of a scene that is being viewed by a user. Image capture module 110 may include a camera. The camera may be pointed such that it captures images of a scene viewed by the user. Image capture module 110 may capture images rapidly. For instance, multiple frames may be captured by image capture module 110 every second. Some or all of these images may be processed to determine the location of various objects within the real-world scene, such as persons and their identities.

Images captured by image capture module 110 may be passed to face identification and tracking module 120. Face identification and tracking module 120 may first locate each face present within an image received from image capture module 110. Face identification and tracking module 120 may capture and store an image of a person's face who spoke. As such, an image may be stored of the person who spoke. Face identification and tracking module 120 may then determine if the face corresponds to a previously-identified person. Face identification and tracking module 120 may have access to a database of persons that the user has previously interacted with. Such a database may indicate whether or not language translation services are necessary for the person. Once a person has been located and, possibly, identified, a location of the person (or, more specifically, possibly a location of the face of the person), may be tracked as they move within and into and out of the scene viewed by the user. If the identity of the person associated with the face is not identified, the person may be identified as a stranger. In some embodiments, the location of a person's eyes is tracked. Tracking a person's eyes may be useful to determine: who they speaking to, and for superimposing virtual objects over the person's face and/or eyes (such that when the virtual object is viewed by the user, the user at least appears to be maintaining eye contact with the person.

Audio capture and positioning module 130 may capture audio in the vicinity of system 100. For instance, audio capture and positioning module 130 may be configured to capture speech spoken by persons (also referred to as speakers) present within a scene viewed by the user. Audio capture and positioning module 130 may include one or more microphones. Multiple microphones may be used to assist in determining the location where audio originated, such as based on a time of flight analysis. Audio capture and positioning module 130 may be configured to determine a direction or location from which sound, such as speech, originated. As such, audio capture and positioning module 130 may be used to capture audio and determine the audio's source. For instance, if multiple persons are participating in a conversation, audio capture and positioning module 130 may capture a person's speech and determine which person spoke the speech. In some embodiments, audio capture and positioning module 130 may be used to capture audio of persons not present with a scene viewed by the user. For instance, speech occurring behind the user may still be captured and its source determined.

User preference module 150 may be a computer-readable storage medium configured to store user preferences. User preference module 150 may allow the user to specify which languages the user does or does not want translated into the user's native language. User preference module 150 may also allow a user to specify his native language. User preference module 150 may allow the user to specify whether text of speech is to be requested from other AR devices. Other preferences, such as text size, text color, and/or whether keywords are to be highlighted may be specified by the user and stored using user preference module 150. For instance, a user may be able to specify particular keywords the user would like highlighted in text, such as the user's name (which may serve as a clue of speech that was likely directed specifically to the user).

When audio capture and positioning module 130 captures audio, the audio may be analyzed locally by audio processing engine 135 to determine if the speech is in the user's native language (in some embodiments, such processing may be performed remotely from system 100). If speech is determined to be in the user's native language, no further processing of the language may be conducted. However, if the speech is determined to be in a language other than the user's native language, additional processing may be conducted by system 100 or remotely to provide the user with translated text. In some embodiments, a remote computer system may be used to perform translation and/or transcription services. If speech is determined to not be in the user's native language, a digital representation of the text may be transmitted to a remote system for translation and transcription. In some embodiments, audio processing engine 135 may perform translation and/or transcription services. Whether or not the speech is to be translated into another language, the speech may be transcribed into text for storage, transmission to another AR device, and/or display to the user via the HMD of the AR device.

Communication module 140 may be used to transmit a digital representation of speech (which may be in a foreign language from the user's native or selected language) for translation and/or transcription. The digital representation of the audio may be transmitted wirelessly to a remote server via one or more networks, such as the internet. The remote server may translate and/or transcribe the audio into text. Communication module 140 may also serve to receive the text which may be stored by the AR device and/or may be displayed to the user via an HMD of the AR device.

Additionally, communication module 140 may serve to communicate with other systems/devices providing services for other persons, such as systems similar to system 100. Such communication may allow text of speech to be exchanged directly between AR device via a device-to-device protocol or via a remote system. Such arrangements may allow users to read text corresponding to speech spoken when the user and the user's AR device were not present for the speech if such speech was captured by another AR device. As such, system 100, via communication module 140, may be configured to receive digitized speech or text from other systems, such as other AR devices, for display to the user. Speech or text received via communication module 140 from another system, such as another AR device, may be associated with an identifier that identifies the person who spoke the speech. The identifier may be an image or some other form of data corresponding to what the person looks like. The identifier may be some form of unique identifier that corresponding to the system possessed by the person who spoke the speech. As such, the identifier may allow system 100 to determine to which person text should be attributed.

Display module 170, which may be an HMD, may serve as the output device for text to be presented to a user. For instance, display module 170 may include a projector that either projects light directly into one or both eyes of the user or projects the light onto a reflective surface that the user views. In some embodiments, the user wears glasses (or a single lens) onto which light is projected by the display module 170. Accordingly, the user may view virtual objects and real-world objects present in the scene simultaneously. Since an HMD may be used to present the virtual objects to the user, other persons besides the user may not be able to see the virtual objects. As such, if a speech bubble is presented as a virtual object, only the user may see the text bubble.

Various arrangements may be used by display module 170 to present text to the user that is to be attributed to a particular person. Text to be presented to the user may be presented in the form of a virtual object such as a speech bubble. The speech bubble may be a graphical element that indicates to which person text within the speech bubble should be attributed. Speech bubbles may be superimposed on a real-world scene such that they appear near the person who spoke the speech represented by the text. The speech bubbles may be partially transparent such that the user may see what is "behind" the speech bubble in the real-world scene. Display module 170 may also be used to present additional information, such as a name and language of persons present within the scene. In other embodiments, text may be superimposed as a virtual object over the face of the person who spoke the speech occur sponsor the text. As such, when the user is reading the text, the user will be looking at the person who spoke the speech. To the person who spoke the speech, it may appear as if the user is making eye contact. This may be particularly useful for language translation and/or services for the deaf: the user may read text corresponding to the speech while least maintaining the appearance of eye contact with the speaker. In some embodiments, text corresponding to speech may scroll over the eyes of the speaker to further facilitate the appearance of eye contact between the user and speaker.

User interface module 160 may permit the user to provide input. For example, user interface module 160 may be a bracelet that has one or more buttons on it. The user may be able to actuate these buttons to provide input to system 100. For example, the user may want to activate or deactivate speech translation services or request text corresponding to speech that occurred while the user was not present (or was not paying attention). The user may also use user interface module 160 to scroll through text of previous speech. While a bracelet is one form of user interface, it should be understood that various other user interfaces may be used for a user to provide input, such as a voice-recognition module or eye-tracking module.

Motion/focus tracking module 175 may be used to determine an angle of the user's head and/or the direction of the user's eye focus. To track the angle of the user's head, an accelerometer or gyroscope may be used. In some embodiments, depending on the angle of the user's head, virtual objects superimposed on persons' faces may be unanchored from the faces for display. This may be useful if the user does not care whether other persons in the vicinity know the user is directing his attention to virtual objects. Alternatively, the user may be looking up, as if lost in thought, while is actually directly his attention to virtual objects.

Motion/focus tracking module 175 may include a camera or other form of eye tracking device that may be used to determine where the focus of the user's eyes are directed. Rather than the user's head needing to be at a particular angle, the direction of focus of the user's eyes may determine whether virtual objects superimposed on persons' faces may be unanchored for display. As such, if the user's angle of view, which may be determined by the angle of the user's head and/or the direction of focus of the user's eyes, exceeds a threshold angle from the horizon, virtual objects superimposed on persons' faces may be unanchored for display and may be presented in an alternate format, such as arranged in a horizontal series.

Face superimposition module 180 may receive locations and identities associated with faces (and/or heads) from face identification and tracking module 120. Face superimposition module 180 may determine if the face (or, more specifically, the eyes and the facial region around the eyes) should be superimposed with a virtual object, such as text corresponding to speech spoken by the person. For example, based on input received from a user, face superimposition module 180 may not superimpose virtual objects on any face. (That is, the user may have the ability to turn on and off the superimposition of virtual objects on faces.) Face superimposition module 180 may determine which virtual object should be superimposed over the face. Determining which virtual object should be superimposed over the face may be based on the identity of the person associated with the face, whether the person associated with the face is talking, whether the user is looking at the person, whether the user is talking to the person, and/or a set of user preferences defined by the user. In some embodiments, rather than causing text to be superimposed over the face of the person, face superimposition module 180 may control the size, color, transparency, sharpness, and/or location of speech bubbles.

Figure 7:
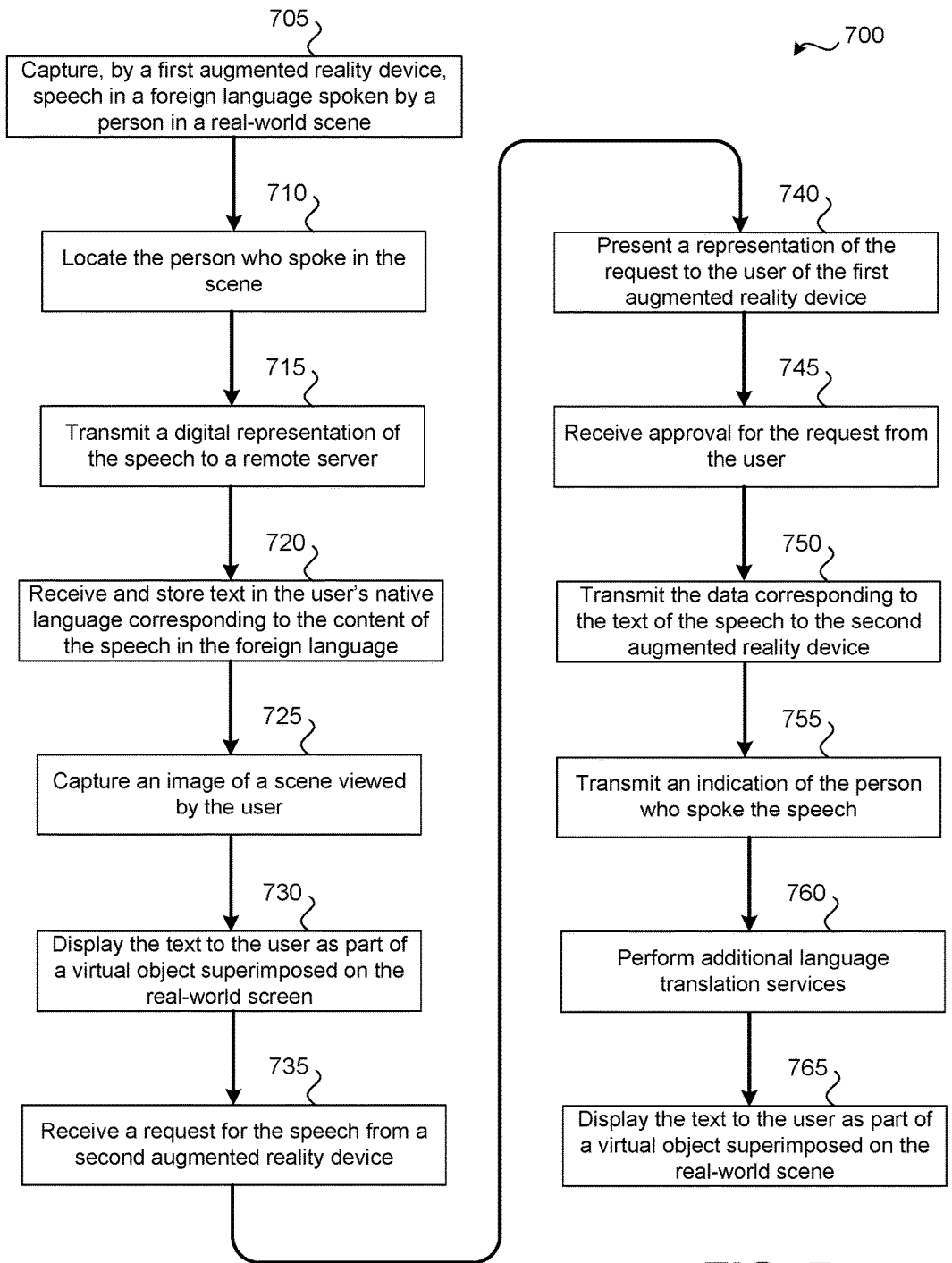
FIG. 7 illustrates an embodiment of a method for using an augmented reality device to provide language translation services and also providing text corresponding to speech for which a user was not present.

At least some of the modules of system 100 may be implemented using a computerized device, such as the computer system of FIG. 7. The modules of system 100 may be combined or divided into fewer or greater numbers of modules. Multiple modules may be implemented by a computerized device. For instance, at least portions of audio capture and tracking module 120 may be implemented as instructions executed by a computerized device (e.g., a processor, computer system).

Figure 1B:
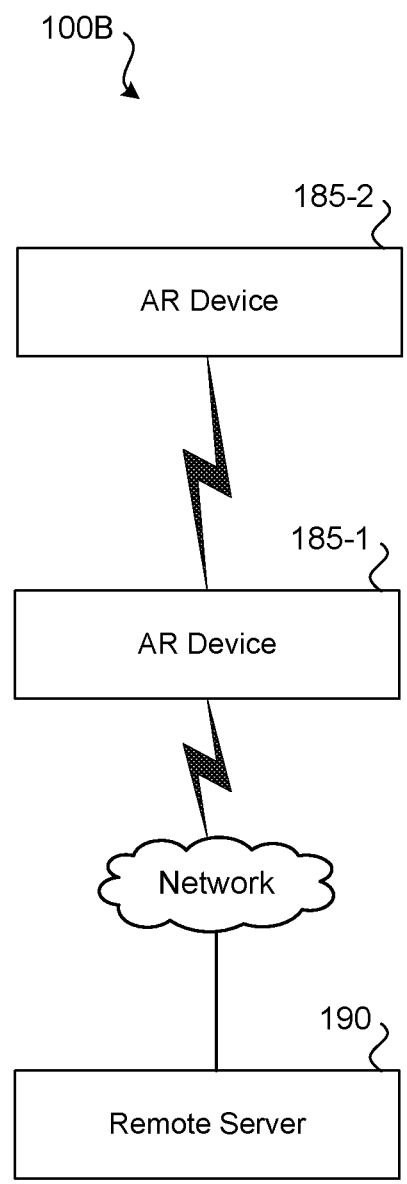
FIG. 1B illustrates an embodiment of a system configured to permit communication between AR devices and/or with a remote computer system.

FIG. 1B illustrates an embodiment of a system 100B configured to permit communication between AR devices and/or with a remote computer system. System 100B may permit communication by an AR device with a remote computer system and also with other AR devices. In FIG. 1B, AR device 185-1 and AR device 185-2 may each include system 100A of FIG. 1A. AR device 185-1 and AR device 185-2 may be able to communicate directly via a device to device protocol, such as BLUETOOTH or WI-FI DIRECT. Accordingly AR device 185-1 may transmit data to and receive data from AR device 185-2.

AR device 185-1 may also be able to communicate wirelessly with a network, which may include one or more private and/or public networks. A private network may include a corporate intranet, a public network may include the Internet. By using a network, AR device 185-1 may be able to communicate with a remote server, such as remote server 190. Remote server 190 may be used to perform services remote from AR device 185-1, such as language translation and/or transcription services.

While only AR device 185-1 is shown as in communication with both another AR device and a network, it should be understood that AR device 185-2 may also be capable of such communication. Further, only a limited number of AR devices 185 and remote servers are illustrated for simplicity; it should be understood that in other embodiments fewer or greater numbers of AR devices 185 and remote computer system may be present.

Figure 2:
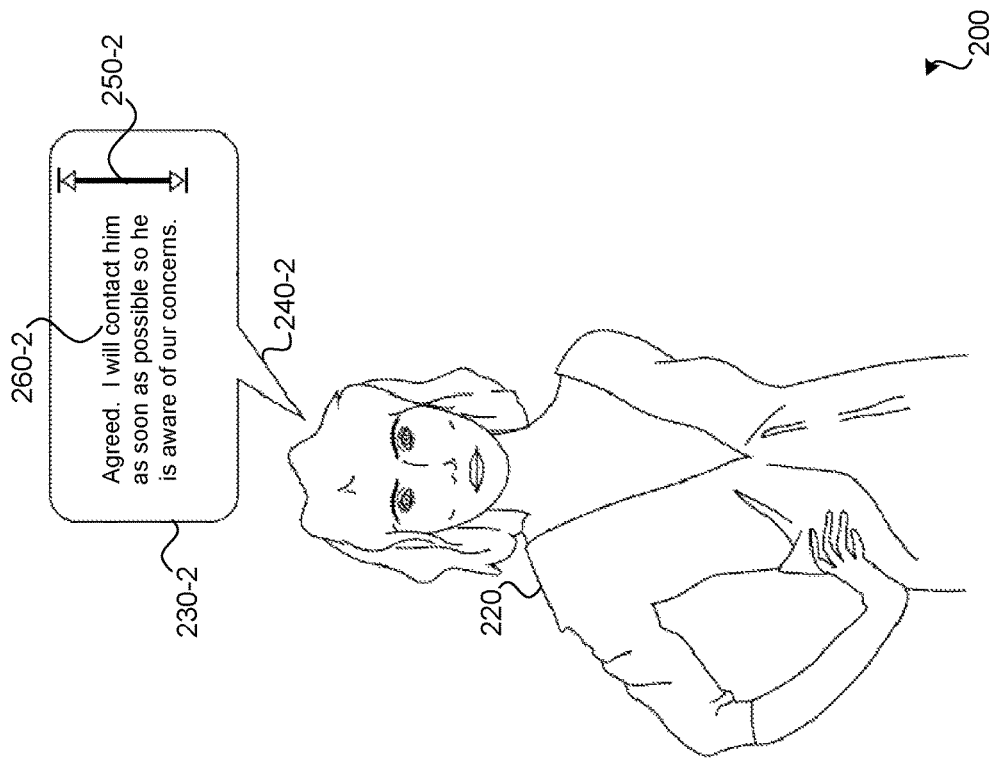
FIG. 2 illustrates an embodiment of a first-person point of view of a head-mounted display being used to provide text corresponding to speech for which a user was not present.
Figure 2:
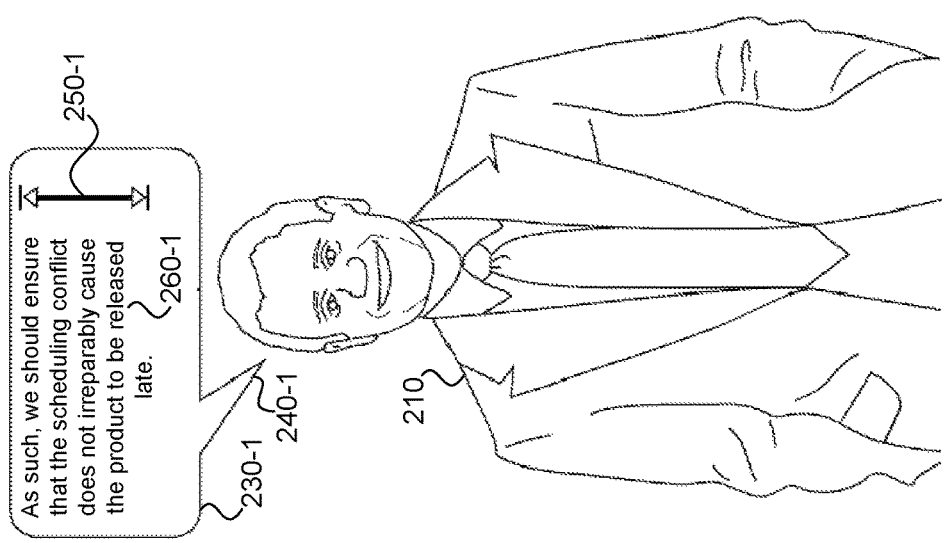

FIG. 2 illustrates an embodiment of a first-person point-of-view 200 of a head-mounted display (HMD) of an AR device being used to provide text corresponding to speech for which a user was not present. FIG. 2 is presented from first-person point-of-view 200 of the user of an AR device. The user of the AR device may not have been present for at least portions of a conversation between person 210 and person 220 (or was not listening). As such, the user of the AR device did not hear at least some speech spoken between person 210 and person 220. In the embodiment of FIG. 2, at least one of person 210 and person 220 are also using an AR device. Upon the user entering the conversation, the user may desire to know the content of the speech spoken between person 210 and person 220 before the user arrived (or before the user was paying attention). When the user has "entered the conversation" may be determined based on a distance between the user and person 210 and/or person 220, eye contact between the user and person 210 and/or person 220, whether a communication link is present between the AR device of the user and an AR device of person 210 and/or person 220, for example. The AR device used by the user may request and obtain, if permission is given, information corresponding to speech between person 210 and person 220 from an AR device used by either person 210 or person 220. The information obtained may indicate an identifier of each person who spoke the speech such that text of the speech may be attributed to the appropriate person.

Text received by the AR device of the user may be presented to the user via an HMD of the AR device. Speech bubbles 230 may be used by the AR device to present text corresponding to the speech spoken between person 210 and person 220 from before the user entered the conversation. Text corresponding to speech spoken by person 210 may be displayed by speech bubble 230-1. Text corresponding to speech spoken by person 220 may be displayed via speech bubble 230-2. In reference to speech bubble 230-1, person 210 spoke the speech corresponding to text 260-1. This text may have been spoken by person 210 before the user of the AR device entered the conversation between person 210 and person 220. This may mean that text 260-1 was spoken by person 210 before the AR device of the user and the AR device of person 210 (or person 220) was in communication. While speech bubbles 230 may be used to display text spoken when the user was not present, speech bubbles 230 may also be used to display text spoken while the user was present. This may be useful for if the user's mind wandered, the user is having trouble hearing person 210 and/or person 220, and/or the user wishes to refresh himself on details of the conversation. The speech bubbles may be updated as new speech occurs.

Graphical elements 240 may be part of speech bubbles 230 and may be used to indicate the particular person who spoke the speech corresponding to the text within the speech bubble. For example, graphical element 240-1 of speech bubble 230-1 indicates that person 210 spoke the speech corresponding to text 260-1. If speech bubble 230-1 is repositioned by the AR device displaying the speech bubble 230-1 to the user via the HMD, the shape of graphical element 240-1 may be modified in order to continue to indicate that person 210 spoke the content of speech bubble 230-1.

The user may be able to review additional text other than what is currently displayed via speech bubbles 230. For example, scrollbars 250 may be manipulated by the user (such as via a user input module of the AR device) to view text corresponding to earlier spoken speech or later spoken speech. If the user interacts with scrollbar 250-2 to scroll back to text corresponding to earlier speech by person 220, the content of speech bubble 230-1 may be modified to display text corresponding to speech spoken by person 210 immediately before or immediately after the now displayed speech within speech bubble 230-2. Accordingly, the user may be able to better understand the context of the speech present within speech bubble 230-2. For example, text 260-2 may make little sense to the user without reading the text 260-1, to which text 260-2 was in response. It should be understood that the use of speech bubbles 230 and scrollbars 250 are exemplary virtual objects used to display text corresponding to speech to the user wearing the HMD of the AR device. Other arrangements may be used to present the text. For example, in some embodiments, the text may be superimposed over the face of the person who spoke the text. As such, when the user is reading the text, the user may be able to simultaneously read the text and at least appear to be maintaining eye contact with the person who spoke the speech corresponding to the text. If the user shifts the focus of his eyes from the speech bubble to the person, the speech bubble and its text may be made transparent, hidden, blurred, moved, or reduced in size. When the user's eye focus returns to the text, the speech bubble and text may be made more opaque, sharpened, moved, or enlarged in size.

While some text presented within speech bubbles 230 may correspond to speech that was spoken before the user had entered the conversation, additional text may be added to the speech bubbles if persons 210 and 220 continue talking. As such, the content of speech bubbles 230 may be updated in real-time or near real-time to match the conversation. If the user has interacted with scrollbars 250 to review earlier conversation, text corresponding to the most recent speech may be available for reading by the user when scrollbars 250 are used to indicate the most recent text should be displayed. Text presented via speech bubbles 230 may be time stamped.

While the embodiment of FIG. 2 illustrates two person (plus the user) being part of a conversation, it should be understood that greater or fewer numbers of persons may be part of the conversation. Embodiments detailed herein may be directed to situation where many more people are present, such as a presentation or speech being given by a person to an audience. In order for the user to receive text corresponding to the speech, the speaker may not need to be using an AR device, rather as long as another member of the audience is using a second AR device and is capturing audio of the speech, text corresponding to the speech may be received directly from the second AR device in the audience or indirectly, via a computer system, which receive data corresponding to the speech from the second AR device).

Figure 3:
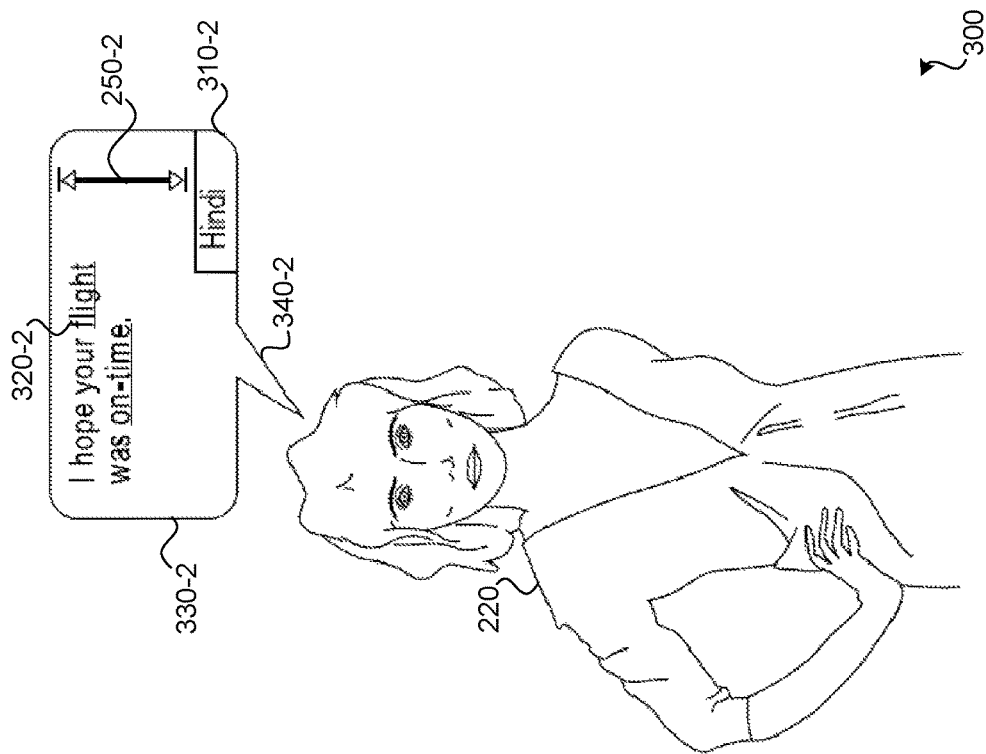
FIG. 3 illustrates an embodiment of a first-person point of view of a head-mounted display being used to provide text corresponding to speech spoken in a language other than a user's preferred language.
Figure 3:
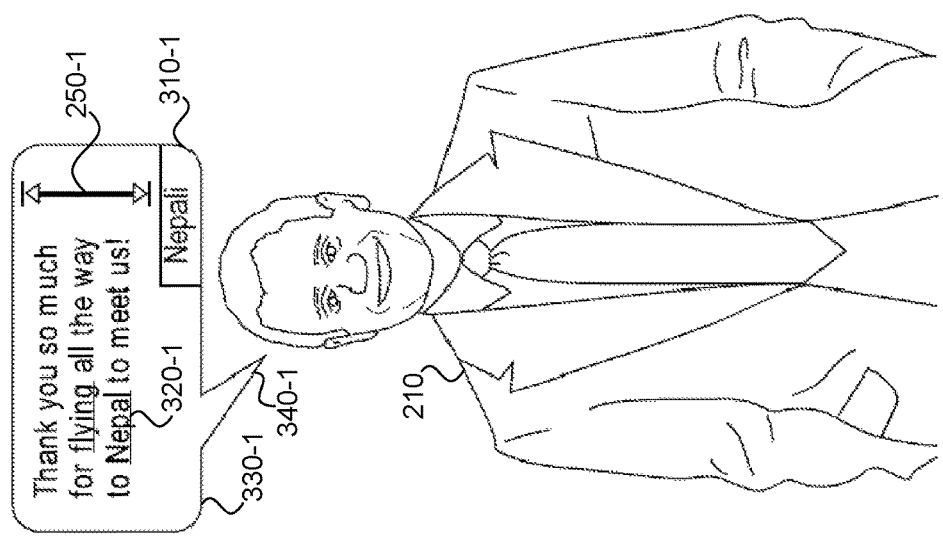

FIG. 3 illustrates an embodiment of a first-person point-of-view 300 of a head-mounted display of an AR device being used to provide language translation services. The AR device may include an embodiment of system 100 of FIG. 1 or some other system configured to provide language translation and transcription services. The first-person point-of-view 300 of FIG. 3 may be from the perspective of a user, viewed through an HMD of an AR device. The user may be able to view a real-world scene that includes real-world items, such as person 210 and person 220. Virtual objects may be superimposed on the real-world scene by the AR device. In the first-person point-of-view 200, two virtual objects are superimposed on the real-world scene: speech bubble 330-1 and speech bubble 330-2. In FIG. 3, person 210 and person 220 are speaking languages other than a preferred (e.g., native) language of the user.

In the first-person point-of-view 300 of FIG. 3, the user is talking with person 210 and person 220. In the illustrated embodiment, person 210 has just completed speaking a sentence, while person 220 had spoken prior to person 210. Each of these persons spoke in language that was non-native to the user. As an example, assume the user's native-language, or language the user prefers to view text in, is English. It should be understood that embodiments detailed herein may be used for translation into languages other than English.

Speech bubbles 330 may be graphical virtual objects that are superimposed over a real-world scene via an HMD. Speech bubbles 330 may contain text that has been translated and transcribed. Each speech bubble of speech bubbles 330 contains a graphical feature to identify with which person the speech bubble is associated. Graphical element 340-1 indicates that speech bubble 330-1 is associated with speech spoken by person 210. Graphical element 340-2 indicates that speech bubble 330-2 is associated with speech spoken by person 220. Speech bubbles may contain indications 310 that identify the language from which the speech was translated. Referring to speech bubble 330-1, the language that person 210 spoke in was Nepali has displayed by indication 310-1. Referring to speech bubble 330-2, the language that person 220 spoke in was Hindu as indicated by indication 310-2. The translation and transcription services may be performed by the AR device of the user, or, in some embodiments, audio captured by the AR device may be transmitted to a remote computer system for translation and transcription services. The AR device may receive, from the remote computer system, text in a language specified by the user, such as the user's native language.

In addition to the speech being translated into a different language for the user, the user may be permitted to view text in speech bubbles 330 of text corresponding to previously spoken text that is no longer displayed. For instance, a user may provide input, such as via user interface module 160 of system 100 of FIG. 1, the user may provide input that indicates he desires to view text associated with previously translated speech. In some embodiments, scrollbars 250 may be selected and may allow a user to provide input to scroll through text of previous speech. If text associated with person 210 is scrolled through, the text associated with person 220 (and, possibly, other persons present in the scene) may scroll such that the speech spoken by person 220 around the same time as person 210 is displayed contemporaneously with the text of the speech for person 210. This may allow the user to determine the context of the text corresponding to speech for person 210. For example, if the user reviews previously associated text with speech and at time 1:24 PM the translated text of speech for person 210 says simply "Yes," this may be of little value to the user without understanding the context of the persons' response. As such, the speech bubble 330-2 for person 220 may be modified to display that at 1:23 PM, person 220 said, for example, "Were you able to alert your colleagues of the new meeting time?"

As person 210 and person 220 move, their corresponding speech bubbles may move with them. In some embodiments, the speech bubbles may remain stationary; however graphical elements 340 of speech bubbles 330 may be modified such as to indicate the person who spoke the speech corresponding to the text. For example, the point of graphical elements 340 may remain on or near the face, mouth, or body of the person corresponding to the text of the speech bubble. If a person moves over a threshold distance away from the user and/or is not facing the user, the person's speech bubble may be hidden. If the person comes back within the threshold distance and/or faces the user, the person's speech bubble may be redisplayed via the HMD to the user.

Rather than using speech bubbles 330, text that was translated may be presented to the user as superimposed by the HMD over the face of the person who spoke the speech. As such, when the user is reading the translated text, the user may be able to maintain (or at least appear able to maintain) eye contact with the person who spoke the speech. In some embodiments, as new speech is translated, the text corresponding to the new speech is presented over the eyes of the person who spoke the corresponding speech. As such, when the user is reading the text, at least the appearance of eye contact may be maintained. If the user shifts the focus of his eyes from the text to the person, the text may be made transparent, hidden, blurred, moved, or reduced in size. When the user's eye focus returns to the text, the text may be made more opaque, sharpened, moved, or enlarged in size.

In addition to transcription and translation, speech bubbles 330 may be used to present text to the user corresponding to speech that occurred while the user was not present. One or more systems capable of capturing speech, such as system 100 of FIG. 1, may be worn or otherwise possessed by persons 210 and 220. When the user comes into the vicinity of the persons, the persons may permit their previous conversation to be accessed by the user. For example, person 210 and 220 may each be required to provide input to their systems or preconfigure their systems to indicate that the user is permitted access. Text or audio may be transmitted from one or both of the systems of persons 210 and 220 to the system of the user. If audio is received by the system of the user, the audio may be transcribed and/or translated into the user's native language, then displayed to the user in the form of a speech bubble. If text is transmitted to the user's system, the text may be translated, if necessary, and displayed via speech bubbles to the user. Text or audio may be transmitted directly between AR devices or via a remote computer system.

An indication of the person who spoke the text or speech may also be received by the AR device used by the user. This indication may be a picture of the person who spoke the text. For instance, an image of person 210 may be associated with text to be displayed via speech bubble 330-1. The image may be used by the user's system to identify the person who spoke the text. In some embodiments, a device identifier may be associated with text to be displayed via speech bubble 330-1. The device identifier may correspond to an AR device worn or otherwise possessed by person 210. The user's system may be able to determine the position of the AR device associated with the device identifier and may attribute the text or speech to the person wearing or otherwise possessing the AR device.

In some embodiments, keywords within text displayed to the user by the HMD of the AR device may be emphasized. Such emphasis may allow a user to quickly review text for key points being made by the person to whom the text is attributed. Keywords may be determined based on emphasis applied by the person who spoke the word or based on a dictionary that assigns emphasis to particular words. Referring to FIG. 3, keywords that are emphasized include keyword 320-1 and keyword 320-2. Emphasis may include highlighting, italicizing, bolding, using a different color, flashing, and/or otherwise making portions of text stand out from other text. Specific keywords may be defined by the user of the AR device and may be stored in a user preference database. For example, the user's name may be selected by the user as a keyword. This may be particularly useful for the user to determine if a particular statement was directed specifically at the user.

Figure 4:
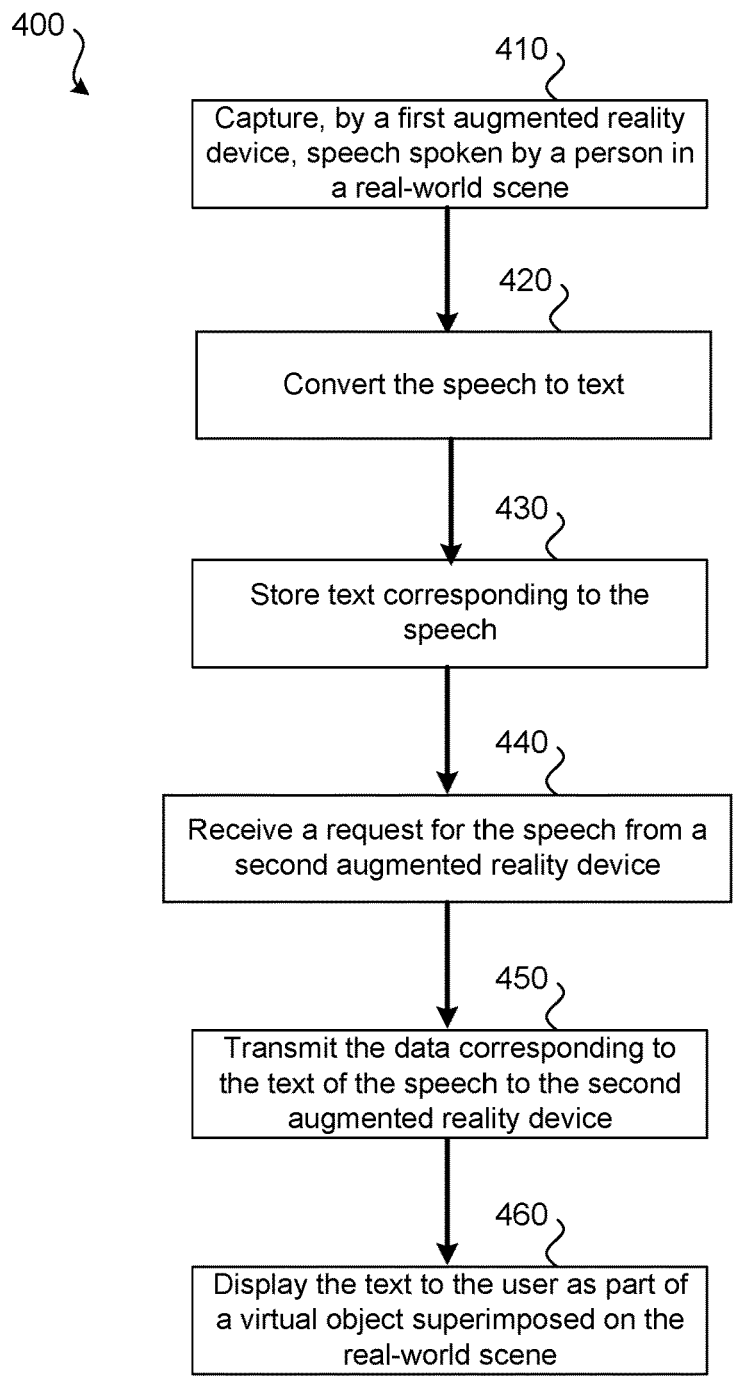
FIG. 4 illustrates an embodiment of a method for using an augmented reality device to provide text corresponding to speech for which a user was not present.

Various methods may be performed using the system of FIG. 1 to superimpose virtual objects over a real-world scene, such as in FIGS. 2 and 3. FIG. 4 illustrates an embodiment of a method 400 for using an augmented reality device to provide text corresponding to speech for which a user was not present. Method 400 may involve the use of an AR device by a user, the AR device may include system 100 of FIG. 1. Means for performing method 400 include an AR device having a HMD. Means for performing method 400 further include: an audio capture and positioning module, which may include one or more microphones; an image capture module, which may include one or more cameras; a face identification and tracking module; a face superimposition module; a user preference module, which may include a computer-readable storage medium; a display module, which may include a head-mounted display (HMD), a motion/focus tracking module, which may include one or more cameras; a user interface module; a communication module; and an audio processing engine. At least some of the various modules and engines may be performed by one or more processors. More generally, steps of method 400 may be performed by a computerized device, such as a computer system.

At step 410, speech spoken by a person present within a real-world scene may be captured by a first AR device. Speech spoken within the real-world scene may include speech from one or more persons. One or more microphones present on the first AR device may be used to capture the speech and determine the direction from which the speech originated. In some embodiments, at least some of the speech captured by the first AR device may be spoken by the person wearing or otherwise using the first AR device. In some embodiments, the speech captured by the first AR device is stored locally. In other embodiments, a digital representation of the speech is transmitted to remote computer system for storage and/or transcription.

At step 420, the speech captured at step 410 is transcribed into text. This step may be performed by the first AR device or the speech captured at step 410 may be transmitted to a remote computer system, which may then perform the transcription of the speech into text. An indication of the person who spoke the speech corresponding to the text may be stored with the text. In some embodiments, the indication of the person who spoke the text is an image of the person. This image may be captured by the first AR device. In other embodiments, an identifier may be assigned to the person who spoke the speech based on the direction from which the speech originated, or the identifier may be based on an AR device in use by the person.

In some embodiments, while the user of the AR device is talking, the processor of the AR device may be idle (e.g., not translating or transcribing speech by some other person). Rather than remaining idle, the processor of the AR device may be devoted to reprocessing previously stored speech to refine the translation and/or transcription. As such, a stored transcription of previous speech may be updated to be more accurate. This may be especially useful if the transcription is later provided to other persons.

The text corresponding to the speech may be stored at step 430. The text may be stored by the first AR device or may be stored remotely, by the remote computer system. If transcription services are performed by a remote computer system but the text is to be stored locally by the first AR device, data containing the text may be transmitted from the remote computer system to the first AR device.

At step 440, a request for text corresponding to the speech captured at step 410 may be received from a second AR device. The second AR device may be worn or otherwise used by a user who is not present when the speech captured at step 410 was spoken. As such, the request received at step 440 may occur when the user has entered the conversation (or speech, presentation, etc.) that contains the speech spoken at step 410. The request for the text corresponding to the speech may be received by the first AR device from the second AR device. The request for the text may indicate a period of time for which the second AR device is requesting text. For instance, the user of the second AR device may provide input to the second AR device specifying that text for the previous five minutes of speech is desired. The time period for which text is requested may be based on several factors, including: a time period selected by the user of the second AR device, a time period selected by the user of the first AR device, a length of time the first AR device has been capturing audio, a predefined period of time for which text corresponding to speech is storing, etc. The request for the speech at step 440 may only occur if the user of the second augmented reality device provides input requesting the text. In other embodiments, the second AR device may request the text without requiring user input. Whether user input is required or not may be based on a user preference stored by the second AR device.

At step 450, assuming the user of the first AR device has provided permission, data corresponding to the text of the speech captured at step 410 may be transmitted to the second AR device. Such a transmission may be direct: from the first AR device to the second AR device. Such a transmission may also be indirect: the data containing the text may be received by the second AR device from a remote computer system that has stored the text corresponding to the speech captured by the first AR device at step 410. In addition to the text of the speech, the data transmitted at step 450 may contain indications of the persons who spoke the speech corresponding to the text. As such, the text may be attributed to the appropriate person who spoke the corresponding speech. In some embodiments, the indications may be images of the one or more persons who spoke speech. If the indications are images, the second AR device may match the persons present in the images with the persons present in the real-world scene to identify who spoke the text. In other embodiments, an identifier, such as a serial number or IP address, may be used to indicate in AR device worn by the person who spoke the text. As such, by determining the location of the AR device indicated by the identifier, the speaker of the text may be identified.

At step 460, the text may be presented to the user of the second AR device in the form of one or more virtual objects. The second AR device may use its HMD to present the text to the user as superimposed over the real-world scene. As such, if the user is looking at one or more of the persons who spoke the speech captured at step 410, at least some of the text corresponding to speech spoken by such persons may be displayed as superimposed by the HMD on the real-world scene. Since an HMD is used to present the text to the user, only the user may be able to view the text. Other persons present in the vicinity of the user may be unaware that such text is being presented to the user. The virtual objects presented to the user may include one or more speech bubbles, such as those presented in FIGS. 2 and 3. Each speech bubble may hover over the head of the person to which the text is attributed. In other embodiments, the text may be superimposed over the face of the person who spoke the corresponding speech, thereby when the user reads the text it will appear to persons present in the vicinity of the user that the user is making eye contact with the person who spoke the speech corresponding to the text. As additional speech is spoken by persons in the vicinity of the user, the virtual objects presenting the text may be updated to include text corresponding to the new speech. For such speech where the second AR device is present, capturing transcription of the speech may be performed directly by the second AR device rather than via the first AR device.

Figure 5:
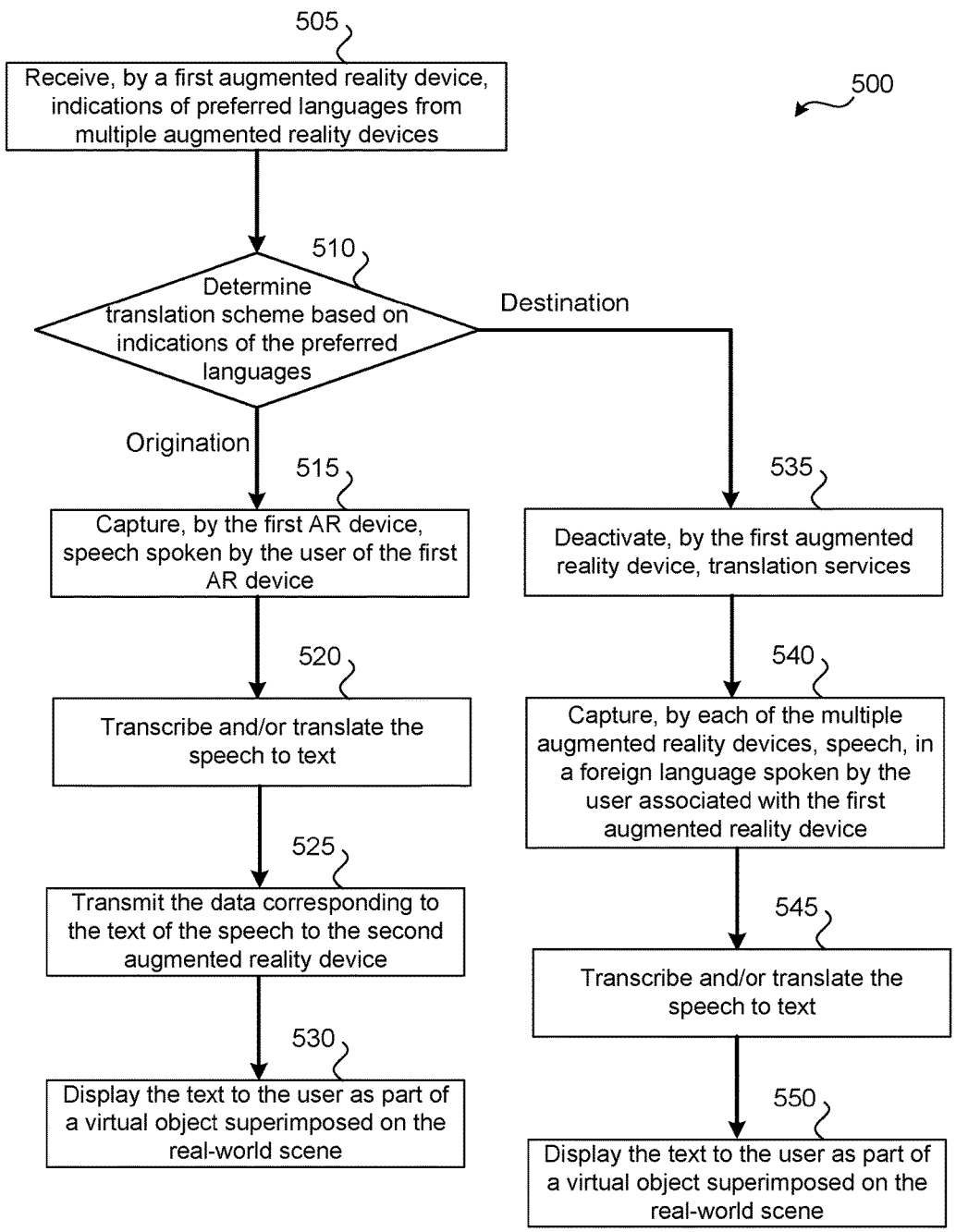
FIG. 5 illustrates an embodiment of a method for using an AR device to provide language translation services.

FIG. 5 illustrates an embodiment of a method 500 for using an AR device to provide language translation services. In method 500, translation services may be performed by the speaker's AR device or the listener's AR device, whichever is determined to be more efficient (e.g., based on total amount of power consumption and/or processing). Method 500 may involve the use of an AR device by a user, the AR device may include system 100 of FIG. 1. Means for performing method 500 include multiple AR devices having HMDs. Means for performing method 500 further include instances of: an audio capture and positioning module, which may include one or more microphones; an image capture module, which may include one or more cameras; a face identification and tracking module; a face superimposition module; a user preference module, which may include a computer-readable storage medium; a display module, which may include a head-mounted display (HMD), a motion/focus tracking module, which may include one or more cameras; a user interface module; a communication module; and an audio processing engine. At least some of the various modules and engines may be performed by one or more processors. More generally, steps of method 500 may be performed by a computerized device, such as a computer system.

When two persons are having a one-on-one conversation, there may be no efficiency gains to having an AR device of one of the persons performing all of the language translation services instead of the AR device associated with the other person. However, in a larger group this may not remain true. For example, if a speaker speaks in a first language, while each of a plurality of listeners prefers a same second language, it may be more efficient for the AR device of speaker to handle translation services and provide text to each other AR device (rather than having each AR device of the listeners individually perform translation services). Therefore, an analysis may be performed to determine whether it is more efficient to have a speaker's AR device perform language translation services or it is more efficient to have listeners' AR devices perform language translation services. As an example, if a speaker is giving a speech or presentation, it may be more efficient for an AR device of the speaker to perform translation services than for each audience member's AR device to perform translation services.

At step 505, an indication of a preferred language may be received by a first user's AR device from AR devices of other users within a predefined distance, within communication range, and/or facing the first user. Based on these indications, the first user's AR device may be able to determine how many translations are required and into which languages. The indications may be received via a direct communication protocol (e.g., BLUETOOTH, WIFI DIRECT) or via a network (e.g., a WIFI network).

At step 510, a determination may be made based on predefined criteria as to whether the first user's AR device should handle at least some translation services or the other users' AR devices should handle translation services. The predetermine criteria may specify that if a particular number of AR devices (e.g., 2, 3, 4, or more) are associated with the same preferred language, the first user's AR device should handle translation services and provide text to at least some of the other users' AR devices. Additional or alternative criteria may be used to determine which AR device should perform (or manage) language translation services. A battery charge level of each AR device may be factored in. If one or more of the other users' AR devices battery levels are low (e.g., less than 10%), to conserve power, the first user's AR device may perform the translation services and provide text to the other users' AR devices (or at least the AR device with the low battery level). Also, having a speaker's AR device perform translation services may be more accurate because a microphone of an AR device possessed by the speaker may be able to capture the speaker's speech more accurately. As such, in some embodiments, the speaker's AR device (the AR device of whoever is talking) performs or manages the translation services.

Step 510 may involve communication between the first user's AR device and one or more other users' AR devices to communicate which AR device(s) are to perform the language translation services (such determination being referred to as the translation scheme). If the first user's AR device is to perform language translation services, the other users' AR devices may receive such a notification, which may trigger the other users' AR devices to not perform language translation services, but rather wait for text to be received for display. Further, battery charge level information may be exchanged between AR devices for use in determining which AR device(s) are best suited, based on available power, to perform the language translation services. Other factors, such as network availability (e.g., the first user's AR device may have access to a wireless network, while other users' AR devices may not), may be used at step 520 to determine the translation scheme. Further, if multiple of the other users have different preferred languages, the first user's AR device may perform language translation services into the most common preferred language, while AR devices associated with other preferred languages may perform separate translation (either from captured audio, or from text provided by the AR device of the first user).

Following step 510, it may be determined that it is more efficient for the AR device of the first user to perform at least some of the language translation services. As such, assuming the first user is speaking, the translation scheme may involve translation services being handled by the first user's AR device at the origination point of the speech by method 500 continuing to step 515. At step 515, speech spoken by the first user may be captured by the first AR device (which may be worn or otherwise possessed by the first user). One or more microphones present on the first AR device may be used to capture the speech from the first user. In some embodiments, the speech captured by the first AR device is stored locally. In other embodiments, a digital representation of the speech is transmitted to remote computer system for storage and/or transcription.

At step 520, the speech captured at step 515 may be translated and transcribed into text. The language of the translation may be based on the indications of preferred languages received at step 505 (e.g., the most popular preferred language from among the multiple AR devices). This step may be performed by the first AR device or the speech captured at step 515 may be transmitted to a remote computer system, which may then perform the translation and/or transcription of the speech into text.

At step 525, assuming the user of the first AR device has provided permission, data corresponding to the translated text of the speech captured at step 515 may be transmitted to the other AR devices that are associated with the language the speech was translated into. Such a transmission may be direct: from the first AR device to the other AR devices. Such a transmission may also be indirect: the data containing the text may be received by the other AR devices from a remote computer system that has stored the text. In addition to the text of the speech, the data transmitted at step 525 may contain an indication of the person who spoke the speech corresponding to the text. As such, the text may be attributed to the appropriate person who spoke the corresponding speech. In some embodiments, an identifier, such as a serial number or IP address, may be used to indicate the first AR device worn by the user who spoke the speech corresponding to the text.

At step 530, the text may be presented to the users of the other AR devices in the form of one or more virtual objects. The other AR devices may use their HMDs to present the text to the associated users as superimposed over the real-world scene. As such, if the other users are looking at the first user who spoke the speech captured at step 515, at least some of the text corresponding to speech spoken by such persons may be displayed as superimposed by the HMD on the real-world scene. Since an HMD is used to present the text to each user, only the user wearing the HMD may be able to view the text. Other persons present in the vicinity of the user may be unaware that such text is being presented to the user. The virtual objects presented to each user may include one or more speech bubbles, such as those presented in FIGS. 2 and 3. Each speech bubble may hover over the head of the person to which the text is attributed. In other embodiments, the text may be superimposed over the face of the person who spoke the corresponding speech, thereby when the user reads the text it will appear to persons present in the vicinity of the user that the user is making eye contact with the person who spoke the speech corresponding to the text. As additional speech is spoken by persons in the vicinity of the user, the virtual objects presenting the text may be updated to include text corresponding to the new speech.

Returning to step 510, if translation services are to be performed by the AR devices other than the first AR device, method 500 may proceed to step 535. At step 535, translation services performed by the first AR device may be deactivated. However, in some embodiments, both the origination and destination options to step 510 may be followed for different AR devices. For example, the first AR device may perform translation into the most common preferred language while translation into a language preferred by a user of a specific AR device is performed at the destination AR device.

At step 540, speech by the first user of the first AR device may be captured using the AR devices of one or more other users (which are the destination). This speech may be spoken by the first user in a real-world scene viewed by the user of the AR device. Referring to system 100 of FIG. 1, speech may be captured by audio capture and positioning module 130 in an AR device worn or otherwise possessed by the one or more other users. This speech may be digitized by audio processing engine 135 into a format appropriate to be analyzed and/or transmitted for analysis to a remote computer system.

At step 545, the speech captured at step 540 may be translated and/or transcribed into text. The language of the translation may be based on the preferred language of each user of the AR devices that captured the speech at step 540. The transcription and translation may be performed by each of the multiple AR devices that captured the speech at step 540 or the speech may be transmitted to a remote computer system, which may then perform the translation and/or transcription of the speech into text. Text that has been translated and/or transcribed by one of the AR devices may be shared with other AR devices (e.g., AR devices with the same preferred language).

At step 550, the text may be presented to the users of the other AR devices in the form of one or more virtual objects. The other AR devices may use their HMDs to present the text to the associated users as superimposed over the real-world scene. As such, if the other users are looking at the first user who spoke the speech captured at step 540, at least some of the text corresponding to speech spoken by such persons may be displayed as superimposed by the HMD on the real-world scene. Since an HMD is used to present the text to each user, only the user wearing the HMD may be able to view the text. Other persons present in the vicinity of the user may be unaware that such text is being presented to the user. The virtual objects presented to each user may include one or more speech bubbles, such as those presented in FIGS. 2 and 3. Each speech bubble may hover over the head of the person to which the text is attributed. In other embodiments, the text may be superimposed over the face of the person who spoke the corresponding speech, thereby when the user reads the text it will appear to persons present in the vicinity of the user that the user is making eye contact with the person who spoke the speech corresponding to the text. As additional speech is spoken by persons in the vicinity of the user, the virtual objects presenting the text may be updated to include text corresponding to the new speech. To the users, step 530 and 550 may be identical or nearly identical, the difference being which AR device was responsible for conducting/managing the translation and transcription.

Figure 6:
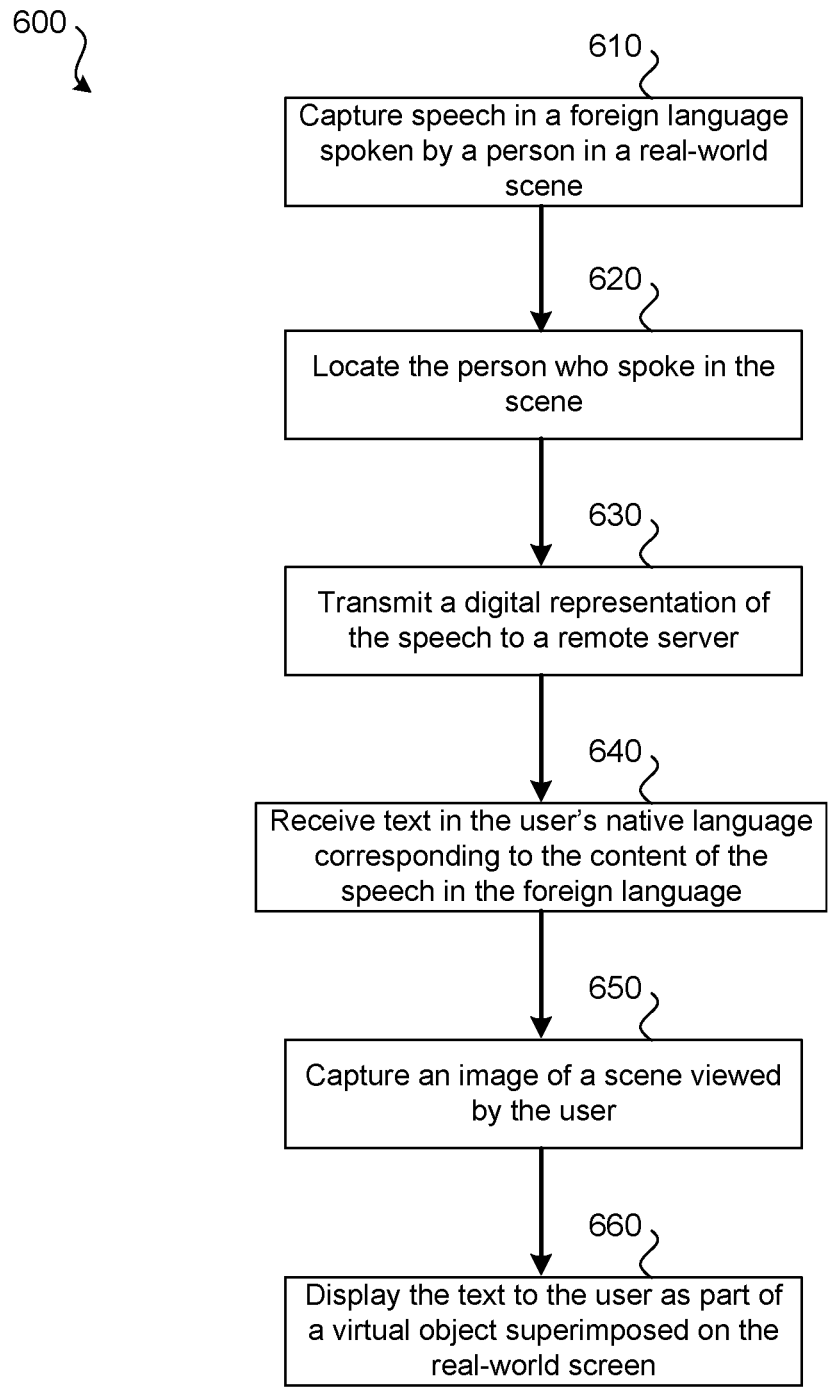
FIG. 6 illustrates an embodiment of a first-person point of view of a head-mounted display being used to provide language translation services.

FIG. 6 illustrates an embodiment of a method for using an AR device to provide language translation services. Method 600 may involve the use of an AR device by a user, the AR device may include system 100 of FIG. 1. Means for performing method 600 include an AR device having a HMD. Means for performing method 600 further include: an audio capture and positioning module, which may include one or more microphones; an image capture module, which may include one or more cameras; a face identification and tracking module; a face superimposition module; a user preference module, which may include a computer-readable storage medium; a display module, which may include a head-mounted display (HMD), a motion/focus tracking module, which may include one or more cameras; a user interface module; a communication module; and an audio processing engine. At least some of the various modules and engines may be performed by one or more processors. More generally, steps of method 600 may be performed by a computerized device, such as a computer system.

At step 610, speech in a foreign language may be captured using an AR device. This speech may be spoken in a real-world scene viewed by the user of the AR device. Referring to system 100 of FIG. 1, speech may be captured by audio capture and positioning module 130. This speech may be digitized by audio processing engine 135 into a format appropriate to be analyzed and/or transmitted for analysis to a remote computer system.

The speech may be analyzed at the AR device to determine if the speech is in the preferred (e.g., native) language of the user. This analysis may be based on sound patterns typical to the user's preferred language. If the speech is in the user's preferred language, no language translation or transcription services may be performed. In some embodiments, only transcription services may be performed.

The location of the speech that is captured may be determined at step 620. This may be particularly useful if multiple persons are present within the real-world scene viewed by the user of the AR device. By determining the location of the captured audio, the appropriate person may be attributed with captured speech. A time-of-flight analysis and multiple microphones may be used to determine where the speech originated from. In other embodiments, other arrangements may be used for determining the source of speech. For example, an AR device worn by the speaker may transmit an indication that the speaker is the person talking.

At step 630, a digital representation of the speech in the foreign language may be transmitted to a remote computer system for remote processing. Referring to system 100 of FIG. 1, communication module 140 may be configured to transmit the digital representation of the speech to a remote server for translation and/or transcription. In some embodiments, the speech may be analyzed locally and no transmission of the digital representation of the speech to a remote computer system is necessary.

If transmitted, the remote computer system may receive the digital representation of the speech (along, possibly, with an indication of the user's native or preferred language), transcribe the speech into text, and translate the text into text in the user's native (or preferred) language. In some embodiments, the speech is translated into the user's native (or preferred) language and is then transcribed into text. Via a user preference input by the user to the user's AR device, a language into which translation is desired may be specified by the user. The indication of the language into which the speech is to be translated may be transmitted along with the digital representation of the speech to the remote computer system. The remote computer system may identify keywords that are to be emphasized within the text to be displayed to the user. This analysis may be based on a stored database of words that are likely to be important, such as names, places, times, dates, etc. The remote computer system may transmit the text in the user's native or preferred language back to the system of the AR device used by the user. In some embodiments, the translation and transcription is performed locally by the system performing method 600. Translation and transcription services may also be performed by an AR device.

At step 640, if the digital representation of the speech was transmitted to a remote computer system for translation and/or transcription, text in the user's native or preferred language may be received from the remote server. An indication may be included with the text as to which person in the real-world scene should be attributed with the text. If processing is performed locally by the system performing method 600, this step may be unnecessary.

At step 650, an image of the scene viewed by the user may be captured by the AR device. This scene may include the person who spoke the speech captured at step 610. Based on the location where the speech was determined to originate, it may be determined which person within the scene spoke the speech of step 610.

At step 660, the text received at step 640 may be superimposed onto the user's view of the real-world scene. As such, the user may directly view the real-world scene, while a virtual object that contains the text received at step 640 may be superimposed on the real-world scene via a head-mounted display. The text displayed at step 660 may be displayed as part of a speech bubble. The speech bubble may be graphically displayed to indicate the person who spoke the text, such as in FIG. 3. Based on which person the speech bubble is pointing at or is near, the user may determine the text is intended to be attributed to that person. In some embodiments, rather than using a speech bubble to display the text, the text may be superimposed over the person who spoke the text, such as superimposed over the person's face. As such, the user may be able to maintain at least the appearance of eye contact, while simultaneously reading the text. If the user's eyes are focused on the person's face, the text being displayed by the AR device to the user via the HMD may be made partially or fully transparent, blurred, or hidden. If the user's eyes focus on the text, the text may be made more opaque, sharpened, or displayed more prominently.

As additional speech is spoken by the person or by another person in the scene, method 600 may repeat to provide the user with translated text. Text associated with previous speech may be scrolled out of view in the speech bubble as new text becomes available.

Aspects of methods 400, 500, and 600 may be combined to provide language translation services and text corresponding to speech for which a person was not present to hear (or was not paying attention). FIG. 7 illustrates an embodiment of a method for using an augmented reality device to provide language translation services and also providing text corresponding to speech for which a user was not present. Method 700 may involve the use of an AR device by a user, the AR device may include system 100 of FIG. 1. Means for performing method 700 include an AR device having a HMD. Means for performing method 700 further include: an audio capture and positioning module, which may include one or more microphones; an image capture module, which may include one or more cameras; a face identification and tracking module; a face superimposition module; a user preference module, which may include a computer-readable storage medium; a display module, which may include a head-mounted display (HMD), a motion/focus tracking module, which may include one or more cameras; a user interface module; a communication module; and an audio processing engine. At least some of the various modules and engines may be performed by one or more processors. More generally, steps of method 700 may be performed by a computerized device, such as a computer system.

At step 705, speech in a foreign language may be captured using an AR device. This speech may be spoken in a real-world scene viewed by the user of the AR device. Referring to system 100 of FIG. 1, speech may be captured by audio capture and positioning module 130. This speech may be digitized by audio processing engine 135 into a format appropriate to be analyzed and/or transmitted for analysis to a remote computer system.

The location of the speech that is captured may be determined at step 710. This may be particularly useful if multiple persons are present within the real-world scene viewed by the user of the AR device. By determining the location of the captured audio, the appropriate person may be attributed with captured speech. A time-of-flight analysis and multiple microphones may be used to determine where the speech originated from. In other embodiments, other arrangements may be used for determining the source of speech. For example, an AR device worn by the speaker may transmit an indication that the speaker is the person talking.

At step 715, a digital representation of the speech in the foreign language may be transmitted to a remote computer system for remote processing. Referring to system 100 of FIG. 1, communication module 140 may be configured to transmit the digital representation of the speech to a remote server for translation and/or transcription. In some embodiments, the speech may be analyzed locally and no transmission of the digital representation of the speech to a remote computer system is necessary.

If transmitted, the remote computer system may receive the digital representation of the speech (along, possibly, with an indication of the user's native or preferred language), transcribe the speech into text, and translate the text into text in the user's native (or preferred) language. In some embodiments, the speech is translated into the user's native (or preferred) language and is then transcribed into text. Via a user preference input by the user to the user's AR device, a language into which translation is desired may be specified by the user. The indication of the language into which the speech is to be translated may be transmitted along with the digital representation of the speech to the remote computer system. The remote computer system may identify keywords that are to be emphasized within the text to be displayed to the user. This analysis may be based on a stored database of words that are likely to be important, such as names, places, times, dates, etc. The remote computer system may transmit the text in the user's native or preferred language back to the system of the AR device used by the user. In some embodiments, the translation and transcription is performed locally by the system performing method 700.

At step 720, if the digital representation of the speech was transmitted to a remote computer system for translation and/or transcription, text in the user's native or preferred language may be received from the remote server by the AR device that initially captured the audio. This text may be stored. As such, the text may be available for immediate display and for later retrieval from the AR device. In some embodiments, the text may be stored by the remote computer system that provided translation and transcription services. An indication may be included with the text as to which person in the real-world scene should be attributed with the text. If processing is performed locally by the system performing method 700, this step may be unnecessary.

At step 725, an image of the scene viewed by the user may be captured by the AR device. This scene may include the person who spoke the speech captured at step 705. Based on the location where the speech was determined to originate, it may be determined which person within the scene spoke the speech of step 705. Also, an image of the person who spoke the speech may be captured and stored. This image may be used at a later time by another AR device to determine which person spoke the text.

At step 730, the text received at step 720 may be superimposed onto the user's view of the real-world scene. As such, the user may directly view the real-world scene, while a virtual object that contains the text received at step 720 may be superimposed on the real-world scene via a head-mounted display. The text displayed at step 730 may be displayed as part of a speech bubble. The speech bubble may be graphically displayed to indicate the person who spoke the text, such as in FIG. 3. Based on which person the speech bubble is pointing at or is near, the user may determine the text is intended to be attributed to that person. In some embodiments, rather than using a speech bubble to display the text, the text may be superimposed over the person who spoke the text, such as superimposed over the person's face. As such, the user may be able to maintain at least the appearance of eye contact, while simultaneously reading the text. If the user's eyes are focused on the person's face, the text being displayed by the first AR device to the user via the HMD may be made transparent, blurred, or hidden. If the user's eyes focus on the text, the text may be made more opaque, sharpened, or displayed more prominently. As additional speech is spoken by the person or by another person in the scene, method 700 may repeat to provide the user with translated text. Text associated with previous speech may be scrolled out of view in the speech bubble as new text becomes available.

At step 735, a request for text corresponding to the speech captured at step 705 may be received from a second AR device. The second AR device may be worn or otherwise used by a user who is not present (or was not paying attention) when the speech captured at step 705 was spoken. As such, the request received at step 735 may occur when the user has entered the conversation (or speech, presentation, etc.) that contains the speech captured at step 705. The request for the text corresponding to the speech may be received wirelessly by the first AR device from the second AR device, such as via a device-to-device communication protocol. The request for the text may indicate a length of time of previous text that the second AR device is requesting. For instance, the user of the second AR device may provide input to the second AR device specifying that text corresponding to the previous five minutes of speech is desired. The time period for which text is requested may be based on several factors, including: a time period selected by the user of the second AR device, a time period selected by the user of the first AR device, a length of time the first AR device has been capturing audio, a predefined period of time for which text corresponding to speech is storing, etc. The request for the text corresponding to speech at step 735 may only occur if the user of the second augmented reality device provides input requesting the text. In other embodiments, the second AR device may request the text without requiring user input. Whether user input from the user of the second AR device is required or not may be based on user preference stored by the second AR device.

At step 740, the user of the first AR device may be presented with an indication that the second AR device is requesting the text corresponding to the speech captured at step 705. An indication of a period of time, such as the last ten minutes, for which the second user desires text, may be indicated. The first user may have the ability to accept or deny the request. In some embodiments, each person who spoke may be required to provide consent.

Assuming assent by the first user is provided to the first AR device at step 745 via a user input device of the first AR device or via a predefined user preference that always permits such requests, method 700 may proceed to step 750. At step 750, data corresponding to the text of the speech stored at step 720 may be transmitted to the second AR device. Accordingly, the data corresponding to the speech may be received by the second AR device at step 750. Such a transmission may be direct: from the first AR device to the second AR device. Such a transmission may also be indirect: the data containing the text may be received by the second AR device from a remote computer system that has stored the text corresponding to the speech captured by the first AR device at step 705 (e.g., the remote computer system that provided translation and transcription services to the first AR device).

In addition to the text of the speech, indications of the persons who spoke the speech corresponding to the text may be transmitted at step 755. As such, the text may be attributed to the appropriate person who spoke the corresponding speech. In some embodiments, the indications may be images of the one or more persons who spoke speech; such images may have been captured at step 725. If the indications are images, the second AR device may match the persons present in the images with the persons present in the real-world scene to identify who spoke the text. If text corresponding to a person who is no longer present is received, the text may either not be displayed or may be displayed along with an image of the person who is no longer present. Displaying the text may be useful for context as to other text being presented to the user. In other embodiments, an identifier, such as a serial number or IP address, may be used to indicate an AR device worn by the person who spoke the text. As such, by determining the location of the AR device indicated by the identifier, the speaker of the text may be identified.

At step 760, the user of the second AR device may require additional language translation services. The additional language translation services may be performed by a remote computer system. In some embodiments, the additional language translation services may be performed locally by the second AR device. For example, referring to FIG. 3, person 210 speaks Nepali, person 220 speaks Hindu, and the user may speak English. As such, the text transmitted from the first AR device to the second AR device may have been previously translated into Hindu from Nepali and may now need to be translated from Hindu into English. In some embodiments, rather than translating text for a second time that has already been translated from another language, the original audio of the speech may be translated into the language preferred by the user of the second AR. In some embodiments, a transcription of text in the original spoken language is stored for subsequent translations. The original audio or the transcription of the text in the original spoken language may be stored by either a remote computer system or the first AR device.

At step 765, the text that has been translated into the preferred language of the user of the second AR device may be presented to the user of the second AR device in the form of one or more virtual objects. This text may include text corresponding to speech spoken while the user of the second AR device was not present or was not listening. The second AR device may use its HMD to present the text to the user as superimposed over the real-world scene. As such, if the user is looking at one or more of the persons who spoke the speech captured at step 705 (regardless of whether the user of the second AR device was or was not present), at least some of the text corresponding to speech spoken by such persons may be displayed as superimposed by the HMD on the real-world scene. Since an HMD is used to present the text to the user, only the user wearing the HMD may be able to view the text. Other persons present in the vicinity of the user may even be unaware that such text is being presented to the user. The virtual objects presented to the user may include one or more speech bubbles, such as those presented in FIGS. 2 and 3. Each speech bubble may hover over the head of the person to which the text is attributed. In other embodiments, the text may be superimposed over the face of the person who spoke the corresponding speech, thereby when the user reads the text it will appear to persons present in the vicinity of the user that the user is making eye contact with the person who spoke the speech corresponding to the text. As additional speech is spoken by persons in the vicinity of the user, the virtual objects presenting the text may be updated to include text corresponding to the new speech. For such speech where the second AR device is present, capturing transcription of the speech may be performed directly by the second AR device rather than via the first AR device.

Figure 8:
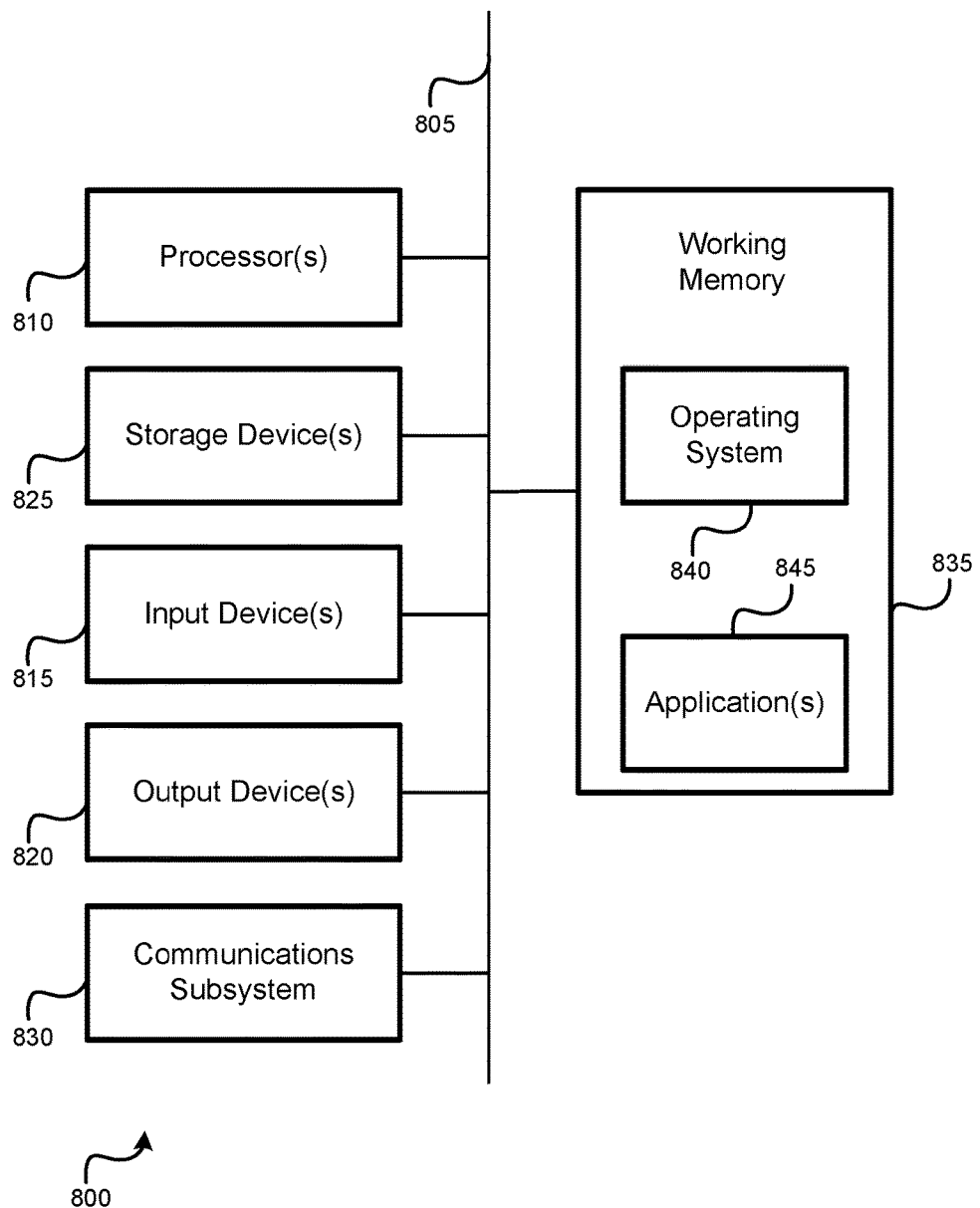
FIG. 8 illustrates an embodiment of a computer system.

A computer system as illustrated in FIG. 8 may be incorporated as part of the previously described computer systems and computerized devices. For example, computer system 800 can represent some of the components of system 100, the augmented reality devices, the HMDs, and the remote computer system discussed in this application. FIG. 8 provides a schematic illustration of one embodiment of a computer system 800 that can perform the methods provided by various other embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard, and/or the like; and one or more output devices 820, which can include without limitation a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the non-transitory storage device(s) 825. Merely by way of example, execution of the sequences of instructions contained in the working memory 835 might cause the processor(s) 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 825. Volatile media includes, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a non-transitory storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the scope of the claims is not bound by the above description.

What is claimed is:

1. A method for using augmented reality devices, the method comprising:
   capturing, by a first augmented reality device, speech spoken by a person while the person is in a real-world scene within a field of view of a user of the first augmented reality device, the first augmented reality device comprising a first head-mounted display;
   generating an indication of the person that spoke the speech based on an identifier of a head-mounted display in use by the person who spoke the speech;
   determining, by the first augmented reality device, a second augmented reality device to receive text corresponding to the speech, the second augmented reality device comprising a second head-mounted display; and
   transmitting, by the first augmented reality device, the text corresponding to the speech and the indication of the person that spoke the speech to the second augmented reality device when the second augmented reality device is present in the real-world scene;
   wherein the second augmented reality device was not present in the real-world scene while the speech was spoken.

2. The method for using augmented reality devices of claim 1, further comprising:
   displaying, by the second head-mounted display of the second augmented reality device, the text corresponding to the speech by the person such that the text is graphically attributed to the person by superimposing the text on the real-world scene.

3. The method for using augmented reality devices of claim 2, wherein:
   the text is graphically attributed to the person via a graphical speech bubble comprising the text that is superimposed on the real-world scene.

4. The method for using augmented reality devices of claim 2, further comprising:
   determining, by the second augmented reality device, one or more words categorized as important.

5. The method for using augmented reality devices of claim 4, wherein displaying, by the second head-mounted display of the second augmented reality device, text corresponding to the speech by the person comprises:
   emphasizing one or more words of the text that were determined to be important.

6. The method for using augmented reality devices of claim 1, further comprising:
   transcribing the speech into the text corresponding to the speech.

7. The method for using augmented reality devices of claim 1, further comprising:
   receiving, by the second augmented reality device, input from a user of the second augmented reality device to access the text corresponding to the speech.

8. The method for using augmented reality devices of claim 1, further comprising:
   transmitting, by the first augmented reality device, data corresponding to the speech spoken by the person in the real-world scene to a remote server, wherein:
   the user of the first augmented reality device uses a first language; and
   the speech is spoken in a second language;
   receiving, by the first augmented reality device, the text of the speech, wherein the text is in the first language; and
   displaying, by the first head-mounted display of the first augmented reality device, the text corresponding to the speech by the person such that the text is graphically attributed to the person by superimposing the text on the real-world scene, wherein the text is in the first language.

9. The method for using augmented reality devices of claim 8, wherein the text corresponding to the speech by the person is displayed such that the text is superimposed over a face of the person.

10. The method for using augmented reality devices of claim 9, wherein the text corresponding to the speech is scrolled across eyes of the person.

11. An augmented reality system comprising:
    a first augmented reality device, comprising:
      a microphone;
      a communication module;
      a first processor;
      a first head-mounted display; and
      a memory communicatively coupled with and readable by the first processor, wherein the first processor is configured to:
        capture, from the microphone, speech spoken by a person while the person is in a real-world scene within a field of view of a user of the first augmented reality device;
        generate an indication of the person that spoke the speech based on an identifier of head-mounted display in use by the person who spoke the speech;
        determine a second augmented reality device comprising a second head-mounted display to receive text corresponding to the speech; and
        cause the text corresponding to the speech and the indication of the person that spoke the speech to be transmitted to the second augmented reality device via the communication module when the second augmented reality device is present in the real-world scene;

wherein the second augmented reality device was not present in the real-world scene while the speech was spoken.

12. The augmented reality system of claim 11, wherein the second augmented reality device comprises:
the second head-mounted display;
a second processor; and
a second memory communicatively coupled with and readable by the second processor, wherein the second processor is configured to:
cause the second head-mounted display to display the text corresponding to the speech by the person such that the text is graphically attributed to the person by superimposing the text on the real-world scene.

13. The augmented reality system of claim 12, wherein: the text is graphically attributed to the person via a graphical speech bubble comprising the text that is superimposed on the real-world scene.

14. The augmented reality system of claim 12, wherein the second processor is further configured to determine one or more words categorized as important.

15. The augmented reality system of claim 14, wherein the second processor is further configured to cause the second head-mounted display to display the text corresponding to the speech by the person such that the text is graphically attributed to the person by superimposing the text on the real-world scene by emphasizing one or more words of the text that were determined to be important.

16. The augmented reality system of claim 11, wherein the first processor is configured to transcribe the speech into the text corresponding to the speech.

17. The augmented reality system of claim 12, wherein the second processor is further configured to receive input from a user of the second augmented reality device to access the text corresponding to the speech.

18. The augmented reality system of claim 11, wherein the first processor is configured to:
cause data corresponding to the speech spoken by the person in the real-world scene to be transmitted via the communication module to a remote server, wherein:
the user of the first augmented reality device uses a first language; and
the speech is spoken in a second language;
receive, via the communication module, the text of the speech, wherein
the text is in the first language; and
cause, by the first head-mounted display of the first augmented reality device, the text corresponding to the speech by the person to be displayed such that the text is graphically attributed to the person by superimposing the text on the real-world scene, wherein the text is in the first language.

19. The augmented reality system of claim 18, wherein the text corresponding to the speech by the person is displayed such that the text is superimposed over a face of the person.

20. The augmented reality system of claim 19, wherein the text corresponding to the speech is scrolled across eyes of the person.

21. An augmented reality apparatus comprising:
first head-mounted display means;
means for capturing speech spoken by a person while the person is in a real-world scene within a field of view of a user of the augmented reality apparatus;
means for generating an indication of the person that spoke based on an identifier of a head-mounted display in use by the person who spoke the speech;
means for determining a second augmented reality apparatus to receive text corresponding to the speech, the second augmented reality apparatus comprising second head-mounted display means; and
means for transmitting the text corresponding to the speech and the indication of the person that spoke the speech to the second augmented reality apparatus when the second augmented reality apparatus is present in the real-world scene;
wherein the second augmented reality apparatus was not present in the real-world scene while the speech was spoken.

22. The augmented reality apparatus of claim 21, further comprising means for transcribing the speech into the text corresponding to the speech.

23. The augmented reality apparatus of claim 21, further comprising:
means for transmitting data corresponding to the speech spoken by the person in the real-world scene to a remote server, wherein:
the user of the augmented reality apparatus uses a first language; and
the speech is spoken in a second language;
means for receiving the text of the speech, wherein the text is in the first language; and
wherein the first head-mounted display means include means for displaying the text corresponding to the speech by the person such that the text is graphically attributed to the person by superimposing the text on the real-world scene, wherein the text is in the first language.

24. The augmented reality apparatus of claim 23, wherein the means for displaying the text comprise means for displaying the text such that the text is superimposed over a face of the person.

25. A computer program product residing on a non-transitory processor-readable medium for augmenting reality, the computer program product comprising processor-readable instructions configured to cause a processor of a first augmented reality device comprising a first head-mounted display to:
capture speech spoken by a person while the person is in a real-world scene within a field of view of a user of the first augmented reality device;
generate an indication of the person that spoke the speech based on an identifier of a head-mounted display in use by the person who spoke the speech;
determine a second augmented reality device comprising a second head-mounted display to receive text corresponding to the speech; and
cause the text corresponding to the speech and the indication of the person that spoke the speech to be transmitted to the second augmented reality device by the first augmented reality device when the second augmented reality device is present in the real-world scene;
wherein and the second augmented reality device was not present in the real-world scene while the speech was spoken.

26. The computer program product for augmenting reality of claim 25, wherein the processor-readable instructions further comprise processor-readable instructions configured to cause the processor to:
transcribe the speech into the text corresponding to the speech.

27. The computer program product for augmenting reality of claim 25, wherein the processor-readable instructions further comprise processor-readable instructions configured to cause the processor to:
- cause data corresponding to the speech spoken by the person in the real-world scene to be transmitted to a remote server, wherein:
- the user of the first augmented reality device uses a first language; and
- the speech is spoken in a second language;
- receive the text of the speech, wherein the text is in the first language; and
- cause, via the first head-mounted display, the text corresponding to the speech by the person to be displayed such that the text is graphically attributed to the person by superimposing the text on the real-world scene, wherein the text is in the first language.

28. The computer program product for augmenting reality of claim 27, wherein the text corresponding to the speech by the person is displayed such that the text is superimposed over a face of the person.

29. The method for using augmented reality devices of claim 1, wherein transmitting the text corresponding to the speech and the indication of the person that spoke the speech is in response to receiving a request from the second augmented reality device.

30. The augmented reality system of claim 11, wherein the first processor is configured to transmit the text corresponding to the speech and the indication of the person that spoke the speech in response to receiving a request from the second augmented reality device via the communication module.

* * * * *